Patented Apr. 22, 1952

2,594,257

UNITED STATES PATENT OFFICE 2,594,257

DETERGENT COMPOSITION

Charles B. Durgin, Anniston, Ala., assignor to Monsanto Chemical Company, St. Louis, Mo., a corporation of Delaware No Drawing. Application May 12, 1949, Serial No. 92,941

3 Claims. (Cl. 252—140)

This invention provides an improved detergent composition.

An object of the present invention is the provision of a detergent composition comprising an active, oily ingredient and a builder ingredient, the whole furnishing a detergent composition having improved physical properties. A further object is to provide a detergent composition having an increased retentivity of the oily ingredient by reason of the presence therein of the mineral attapulgite. A still further object is the provision of a combination of an active ingredient and the mineral attapulgite, which results in a lower soil redeposition during washing and a softer hand of textile products laundered therewith. A still further object is to provide a detergent composition, the ingredients of which remain suspended in the detergent solution and are not picked up by the clothes during washing.

Condensation products of tertiary mercaptans with ethylene oxide are described in and may be prepared by the method described in pending application Serial No. 718,133, filed December 23, 1946, which application is assigned to the same assignee as is the present invention. According to the process described in said application, condensation products are prepared by passing ethylene oxide in the gas or liquid form into a tertiary mercaptan having at least 8 carbon atoms and up to and including 18 carbon atoms in the molecule, which mercaptans are derived from a polymerized olefin. The tertiary mercaptan derived from a polymerized olefin may be prepared as described in U. S. Patent 2,378,030 or U. S. Patent 2,392,555. The condensation products of tertiary mercaptans with ethylene oxide may be prepared in a manner similar to that described in U. S. Patent 2,205,021 describing the condensation of primary mercaptans usually with the aid of an alkaline catalyst.

According to the process described in said pending application Ser. No. 718,133, products containing from 5 moles of condensed ethylene oxide and up to 40 moles of condensed ethylene oxide per mole of mercaptan may be prepared. These products are oily liquid to semi-liquid materials.

In view of the fact that the oily liquid to semi-liquid condensation products resulting from the reaction of ethylene oxide with mercaptans are not readily handled, particularly in the household or when packaged for sale by reason of their objectionable physical properties, these products are usually mixed with various solid salts such as tetrasodium pyrophosphate, sodium carbonate, sodium bicarbonate, or adsorptive material such as starch, etc., which materials serve as adsorbents for the oily condensation product. I have found, however, that even with the use of calcined salts which, as described by British Patent 469,334, have an adsorptive power considerably greater than the crystalline salts, that the oily condensation product readily strikes through the paper package in which the material is contained. Even a mineral having the adsorptive power of kieselguhr lacks the particular properties which are effective for retaining the condensation product in a non-oily, free-flowing form, and at the same time remaining suspended in the washing solution. I have noted that both the minerals kieselguhr and bentonite exhibit the objectionable property of settling out of the detergent solution and are picked up by the clothes to an objectionable degree.

The tenacity with which the various salts or absorbents retain the oily condensation product may be determined by means of a "soaking test," which is carried out as follows: A pile of the adsorbent material containing the oily condensation product is placed on several sheets of the adsorbent paper, such as filter paper, a weight is placed on the pile and then allowed to remain in this position for one week. At the end of this time the paper is removed and solvent extracted; the solvent is then evaporated and the residue weighed. The weight so obtained is a measure of the tenacity with which the powdered adsorbent retains the oily product. As will be obvious, products from which a large quantity of condensation product is transmitted to the paper had a lower retentivity than those from which small amounts of products are transmitted.

Illustrative of the effect of kieselguhr in mixtures containing the oily condensation product of mercaptan with ethylene oxide when subjected to the above "soaking test" I prepared a dry mixture of the following components in parts by weight:

*Example 1*

| | Parts |
|---|---|
| Oily condensation product of tertiary dodecyl mercaptan with about 10.5 moles of ethylene oxide per mole of mercaptan | 20 |
| Tetrasodium pyrophosphate (anhydrous) | 40 |
| Sodium sesquicarbonate | 25 |
| Kieselguhr | 15 |

The above mixture was subject to the above "soaking test" for one week with the following results:

| | |
|---|---|
| Grams condensation product absorbed by filter paper | 0.054 |
| Percentage of total condensation product absorbed by filter paper | 0.135 |

The mineral attapulgite which is employed in my detergent composition is a complex hydrated magnesium aluminum silicate occurring in the form of spicular particles.

On the volatile-free basis attapulgite has the following chemical composition:

| | Per cent |
|---|---|
| $SiO_2$ | 67.0 |
| MgO | 12.5 |
| $Al_2O_3$ | 11.0 |

| | Percent |
|---|---|
| CaO, Fe₂O₃, etc. | 9.5 |
| Ignition loss total while at 18° F | 19–21 |

This material is employed in the finely divided form.

*Example 2*

My detergent composition consists of the following ingredients in parts by weight, total to make 100 parts of product:

| | Parts |
|---|---|
| Ethylene oxide condensation product of a tertiary mercaptan | 8–30 |
| Tetrasodium pyrophosphate | 16–60 |
| Attapulgite (through 200 mesh) | 5–25 |
| Sodium sesquicarbonate | 0–30 |
| Carboxy methyl cellulose | 0–5 |
| Water of crystallization | 0–27 |

As illustrative a specific composition useful for general detergent purposes, the following product is provided:

*Example 3*

| | Parts |
|---|---|
| Oily condensation product of tertiary dodecyl mercaptan with 10.5 moles of ethylene oxide | 20 |
| Tetrasodium pyrophosphate (anhydrous) | 40 |
| Sodium sesquicarbonate | 25 |
| Attapulgite | 15 |

The above composition was prepared in the same manner as that described in Example 1 above, and the ingredients thereof were the same except that the mineral kieselguhr was replaced by the mineral attapulgite.

Upon subjecting this composition to the "soaking test" described above for the same period of time and under the same conditions, the following results were obtained:

| | |
|---|---|
| Grams of condensation product adsorbed by filter paper | 0.022 |
| Percentage of total condensation product adsorbed by filter paper | 0.055 |

Another specific composition useful for detergent purposes may contain the following ingredients:

*Example 4*

| | Parts |
|---|---|
| Condensation product of tertiary dodecyl mercaptan with 7.8 moles of ethylene oxide per mole of mercaptan | 15 |
| Tetrasodium pyrophosphate | 40 |
| Attapulgite | 18 |
| Sodium carbonate | 25.5 |
| Carboxy methyl cellulose | 1.5 |
| Total | 100.0 |

The tetrasodium pyrophosphate may be employed either in the anhydrous or the hydrated form, the latter form usually consisting of decahydrate, although a lower hydrate may also be employed. Water of hydration is indicated in some of the above formulations, it being understood that the water when present is combined either as water or crystallization of salts, usually with the phosphate, although some may also be present as water of crystallization in the sodium carbonate.

The combination of ingredients may be carried out in any convenient manner, but generally I prefer to place the finely ground tetrasodium pyrophosphate in a mechanical mixer, add the liquid oily condensation product, mix thoroughly and then add the attapulgite and then the other ingredients as desired. Where hydrated salts are to be employed in the composition, the hydration of the salt may be carried out in the presence of the oily mercaptan-ethylene oxide condensation product. The water employed for hydration may be added to the hydratable salts, as such, or it may be added as a solution in the mercaptan-ethylene oxide condensation product, this procedure giving somewhat better results. This method is more fully described and particularly claimed in copending application Serial No. 92,953, filed May 12, 1949, which application is assigned to the same assignee as is the present case.

What I claim is:

1. A non-oily, free flowing detergent composition comprising the following ingredients in parts by weight to make 100 parts:

| | Parts |
|---|---|
| Condensation product of a tertiary mercaptan containing from 8 to 18 carbon atoms with 5 to 40 moles of ethylene oxide per mole of mercaptan | 8 to 30 |
| Tetrasodium pyrophosphate | 16 to 60 |
| Attapulgite | 5 to 25 |
| Sodium sesquicarbonate | 0 to 30 |
| Carboxy methyl cellulose | 0 to 5 |
| Water of crystallization | 0 to 27 |

2. A non-oily, free flowing detergent composition comprising the following ingredients in parts by weight:

| | Parts |
|---|---|
| Condensation product of tertiary dodecyl mercaptan with 7.8 moles of ethylene oxide per mole of mercaptan | 20 |
| Tetrasodium pyrophosphate | 40 |
| Attapulgite | 40 |

3. A non-oily, free flowing detergent composition comprising the following ingredients in parts by weight:

| | Parts |
|---|---|
| Condensation product of tertiary dodecyl mercaptan with 10.5 moles of ethylene oxide per mole of mercaptan | 15 |
| Tetrasodium pyrophosphate | 40 |
| Attapulgite | 18 |
| Sodium carbonate | 25.5 |
| Carboxy methyl cellulose | 1.5 |

CHARLES B. DURGIN.

REFERENCES CITED

The following references are of record in the file of this patent:

UNITED STATES PATENTS

| Number | Name | Date |
|---|---|---|
| 2,118,310 | Kauffman | May 24, 1938 |
| 2,205,021 | Schuette | June 18, 1940 |
| 2,296,689 | Soderberg | Sept. 22, 1942 |
| 2,344,268 | Rench | Mar. 14, 1944 |
| 2,491,051 | McCarter | Dec. 13, 1949 |

FOREIGN PATENTS

| Number | Country | Date |
|---|---|---|
| 361,520 | Germany | June 30, 1920 |
| 469,334 | Great Britain | July 23, 1937 |
| 579,835 | Great Britain | Aug. 16, 1946 |

OTHER REFERENCES

Perry and Schwartz: Surface Active Agents, March 11, 1949, Interscience Publ., Inc., p. 378.